(12) United States Patent
Wilson

(10) Patent No.: US 10,877,570 B1
(45) Date of Patent: Dec. 29, 2020

(54) ELECTRONIC DEVICES HAVING KEYS WITH COHERENT FIBER BUNDLES

(71) Applicant: Apple Inc., Cupertino, CA (US)

(72) Inventor: James R. Wilson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/717,798

(22) Filed: Dec. 17, 2019

Related U.S. Application Data

(63) Continuation of application No. 15/832,196, filed on Dec. 5, 2017, now Pat. No. 10,579,157.

(60) Provisional application No. 62/546,424, filed on Aug. 16, 2017.

(51) Int. Cl.
*G06F 3/02* (2006.01)
*G06F 3/023* (2006.01)
*H01H 13/83* (2006.01)

(52) U.S. Cl.
CPC .......... *G06F 3/0216* (2013.01); *G06F 3/023* (2013.01); *H01H 13/83* (2013.01); *G06F 3/0202* (2013.01); *G06F 3/0219* (2013.01); *H01H 2219/0621* (2013.01)

(58) Field of Classification Search
CPC ...... G06F 3/0216; G06F 3/023; G06F 3/0202; G06F 3/0219; H01H 13/83; H01H 2219/0621
See application file for complete search history.

(56) References Cited

U.S. PATENT DOCUMENTS

| | | | |
|---|---|---|---|
| 3,886,544 A | 5/1975 | Narodny | |
| 6,046,730 A * | 4/2000 | Bowen | H04M 1/022 250/227.22 |
| 6,987,466 B1 | 1/2006 | Welch et al. | |
| 8,754,854 B1 | 6/2014 | Hamburgen et al. | |
| 9,435,939 B2 | 9/2016 | Yang et al. | |
| 2007/0081354 A1* | 4/2007 | Wahlstrom | G06F 3/0238 362/551 |
| 2007/0257889 A1 | 11/2007 | Croy | |
| 2008/0143560 A1 | 6/2008 | Shipman | |
| 2013/0114195 A1* | 5/2013 | Lee | H01H 13/83 361/679.01 |

(Continued)

OTHER PUBLICATIONS

Sonder Design, Sonder keyboard, 9 pages, [Retrieved on Aug. 2, 2017], Retrieved from the Internet: <URL: http://sonderdesign.com>.

*Primary Examiner* — Brent D Castiaux
(74) *Attorney, Agent, or Firm* — Treyz Law Group, P.C.; G. Victor Treyz; Joseph F. Guihan

(57) ABSTRACT

An electronic device may have a reconfigurable keyboard. The keyboard may be formed from an array of keys coupled to a housing. Each key may have a movable key member and an associated key display. Control circuitry in the keyboard may direct the key displays to display dynamically adjustable key labels for the keys. Each key movable key member may be formed from a fiber optic plate. The fiber optic plate may be formed from a coherent fiber bundle with opposing first and second surfaces. The first surface may be adjacent to the key display and may receive key label images from the key display. The second surface may face outwardly towards a user and may receive key press input from the fingers of a user while presenting key label images for viewing.

20 Claims, 11 Drawing Sheets

(56) References Cited

U.S. PATENT DOCUMENTS

| | | | |
|---|---|---|---|
| 2014/0037257 A1* | 2/2014 | Yang | G02B 6/0078 385/116 |
| 2015/0061901 A1 | 3/2015 | Casparian et al. | |
| 2015/0234509 A1 | 8/2015 | Guard | |

* cited by examiner

ELECTRONIC DEVICES HAVING KEYS WITH COHERENT FIBER BUNDLES

This application is a continuation of U.S. application Ser. No. 15/832,196, filed Dec. 5, 2017, which is hereby incorporated by reference herein in its entirety, and which claims the benefit of provisional patent application No. 62/546,424, filed Aug. 16, 2017, which is hereby incorporated by reference herein in its entirety.

FIELD

This relates generally to electronic devices and, more particularly, to electronic devices with keys.

BACKGROUND

Electronic devices often include keys. For example, a laptop computer may have a keyboard with a set of keys or a stand-alone keyboard may have a set of keys. Keyboard keys are sometimes provided with dynamic labels. The dynamic labels are covered with clear plastic to allow the labels to be viewed by a user. Due to the thickness of the clear plastic covering the dynamic labels on the keys, the dynamic labels are not visually present at the uppermost surface of the keys and can be difficult to view. The appearance of the keys may also vary in different lighting conditions and may vary undesirably as a function of angle of view.

SUMMARY

An electronic device may have a reconfigurable keyboard. The keyboard may be formed from an array of keys that are received within an array of openings in a housing. Each key may have a movable key member and an associated key display.

Control circuitry in the keyboard may direct the key displays to display dynamically adjustable key labels for the keys. The control circuitry can reconfigure the key labels to support different languages, to support use of the keyboard in a gaming application, or to otherwise customize the appearance of the keys for a user.

Each key member may be formed from a fiber optic plate. The fiber optic plate may be formed from a coherent fiber bundle with opposing first and second surfaces. The first surface may be adjacent to an array of pixels in a key display and may receive key label images from the key display. The second surface may face outwardly towards a user and may receive key press input from the fingers of a user. When pressed by a user, the key member may move towards a component that monitors movement of the key member such as a dome switch or other sensor.

Optical fibers in the coherent fiber bundle may extend between the first and second surfaces in a direction that is parallel to the surface normal of the key display. When a key label image is supplied by the key display of a key, the coherent fiber bundle of that key may present the image for viewing at the second surface. The coherent fiber bundle may have surfaces with non-planar features such as curved surfaces (e.g., surfaces exhibiting compound curvature), surfaces with chamfered edges, and other surfaces.

DETAILED DESCRIPTION

Figure 1:
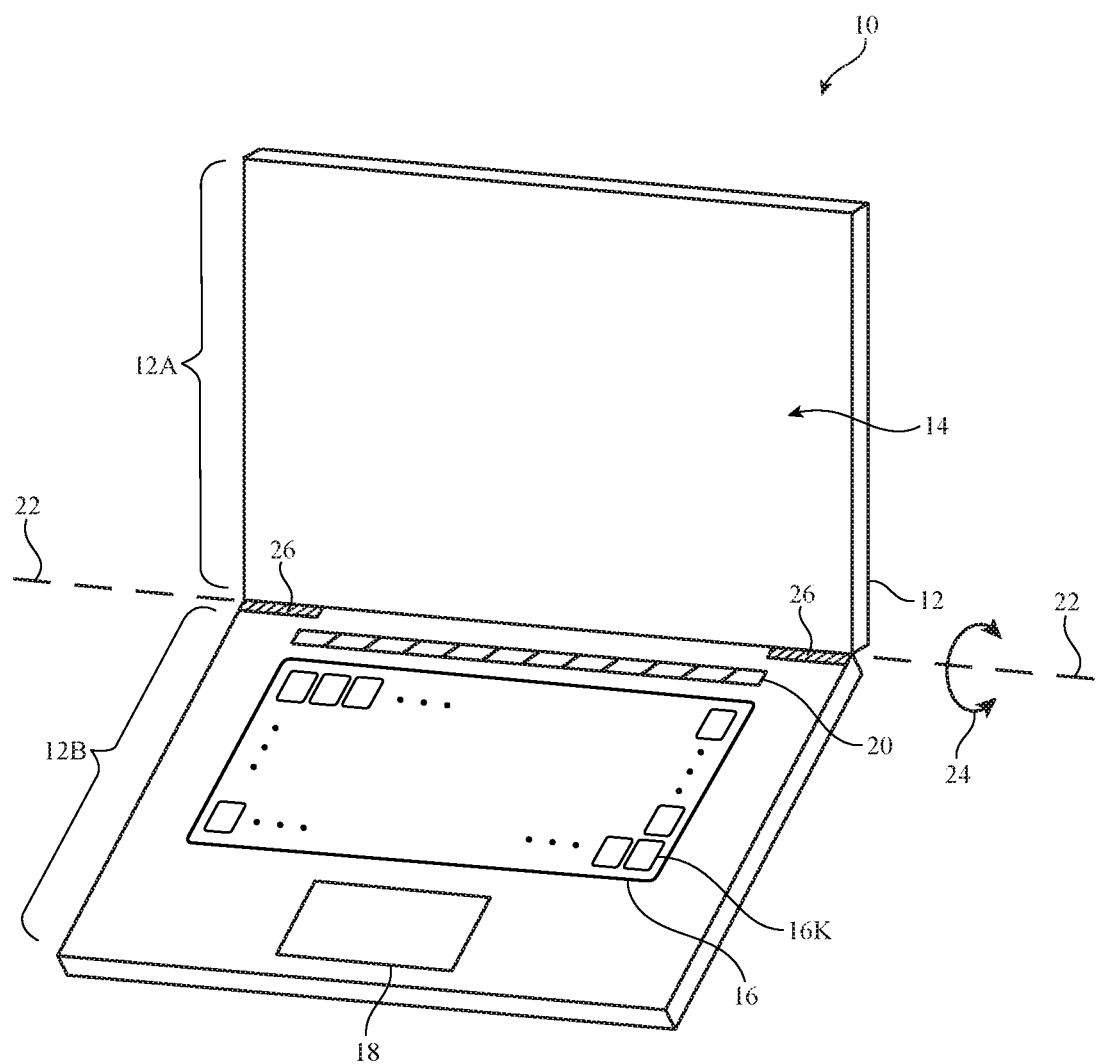
FIG. 1 is a perspective view of an illustrative electronic device such as a laptop computer in accordance with an embodiment.

Electronic devices may have input-output devices such as keys. For example, a laptop computer may have a keyboard for gathering input from a user. Stand-alone keyboards may also be used with equipment such as tablet computers and desk-top computers.

To help a user identify keys in a keyboard, keyboard keys are often provided with labels. The labels (which may sometimes be referred to as glyphs, symbols, key symbols, key labels, etc.), may be used to help a user identify keys. As an example, letter keys can be labeled with letters, number keys can be labeled with numbers, and function keys can be labeled with symbols representing mathematical operations or other functions.

It may be desirable to reconfigure keyboards dynamically to accommodate input for different languages, to temporarily convert a standard keyboard into a gaming keyboard in which keys correspond to particular in-game actions, or to otherwise modify the behavior associated with pressing the keys in the keyboard. In this type of situation, it may also be desirable to provide a user with visual feedback indicating the current status of each key (e.g., whether the key corresponds to an alphanumeric character or to a gaming function, etc.). This can be accomplished by providing keys in a keyboard with dynamic labels. The dynamic labels may be generated using dynamically reconfigurable label displaying components such as organic light-emitting diode displays with arrays of pixels, electrophoretic displays with arrays of pixels, or other pixel arrays (as examples). Configurations in which dynamic labels are presented using lower-resolution configurable output devices may also be used.

With one illustrative configuration, which may sometimes be described herein as an example, each key may be provide with a corresponding dynamically adjustable key display (sometimes referred to as a dynamic key label or dynamic key label device). The key displays may be formed from organic light-emitting diode displays, electrophoretic displays ("e-ink") or other suitable display devices with pixel arrays (e.g., liquid crystal displays, light-emitting diode displays formed from crystalline semiconductor die light-emitting diodes, microelectromechanical systems displays, electrowetting displays, etc.). In some arrangements, key displays may be backlit (e.g., using backlight illumination from a light-emitting diode). In other arrangements, key displays may not be backlit.

The key displays can be configured dynamically based on user input or other input. For example, a user may provide an electronic device with key press input or other user input that directs control circuitry in the electronic device to reconfigure each of the key labels. The user may, for example, desire to switch a keyboard between a first format (e.g., an English-language format) and a second format (e.g., a Greek-language format). In response to user input to switch the keyboard, control circuitry in an electronic device can adjust the key labels being displayed by the key displays from English letters to Greek letters, thereby switching the keyboard from the first format to the second format.

An illustrative electronic device that has a keyboard with reconfigurable keys is shown in FIG. 1. In the example of FIG. 1, device 10 is a laptop computer. Other types of electronic device may be provide with reconfigurable keys, if desired.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Device 10 of FIG. 1 has a two-part housing formed from an upper housing portion such as upper housing 12A and lower housing portion such as lower housing 12B. Upper housing 12A may include a display such as display 14 and may sometimes be referred to as a display housing or lid. Lower housing 12B may sometimes be referred to as a base housing or main housing.

Housings 12A and 12B may be rotatably coupled to each other using one or more hinges 26 along the upper edge of lower housing 12B and the lower edge of upper housing 12A. Hinges 26 may be located at opposing left and right sides of housing 12 along hinge axis 22. Hinges 26 may allow upper housing 12A to rotate about axis 22 in directions 24 relative to lower housing 12B. The plane of lid (upper housing) 12A and the plane of lower housing 12B may be separated by an angle that varies between 0° when the lid is closed to 90°-140°, or more when the lid is fully opened.

As shown in FIG. 1, device 10 may have input-output devices such as track pad 18 and keyboard 16. Track pad 18 may be formed from a touch sensor that gathers touch input (and, if desired, force input) from a user's fingers. Keyboard 16 may have an array of keys 16K. In some arrangements, keys 16K may protrude through openings in the upper wall of housing 12B. Some or all of keys 16K may be reconfigurable and may have key displays that display reconfigurable key labels.

Display 14 may serve as a primary display for device 10 and may sometimes be referred to as a main display. Device 10 may also have one or more additional displays such as ancillary display 20. Ancillary display 20 may be touch sensitive and may serve to display interactive reconfigurable visual elements (icons such as function-key buttons, image thumbnails, etc.). Because ancillary display 20 can be used to display content such as dynamically adjustable function keys, ancillary display 20 may sometimes be referred to as a dynamic function row or dynamic function row display. If desired, a row of reconfigurable keys 16K may be used to display dynamic function row content (e.g., in an arrangement in which ancillary display 20 is omitted) and/or some or all of display 20 may include keys 16K with dynamically adjustable key displays (e.g., a row of dynamically reconfigurable keys 16K may be used to implement the functions associated with a dynamic function row). In either arrangement, dynamically reconfigurable keys 16K may be considered to form part of a keyboard 16 of device 10.

Keys 16K may gather key press input by allowing moving key members in the key to compress dome switches or other switches (mechanical sensors) in response to key press input (e.g., downward force from fingers of a user). In some configurations, keys 16K may include other input components such as touch sensors and/or force sensors for gathering key press input. Key press sensors for use with keys 16K may be resistive touch sensors or resistive force sensors, capacitive touch or capacitive force sensors, acoustic sensors, light-based sensors, or touch and/or force sensors implemented using other technologies. Illustrative arrangements in which keys 16K are pressed to actuate associated switches may sometimes be described herein as an example.

If desired, device 10 may have components such as a camera, microphones, speakers, buttons, status indicator lights, light sensors, temperature sensors, motion sensors, and other input-output devices. These devices may be used to gather input for device 10 and may be used to supply a user of device 10 with output. Ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Figure 2:
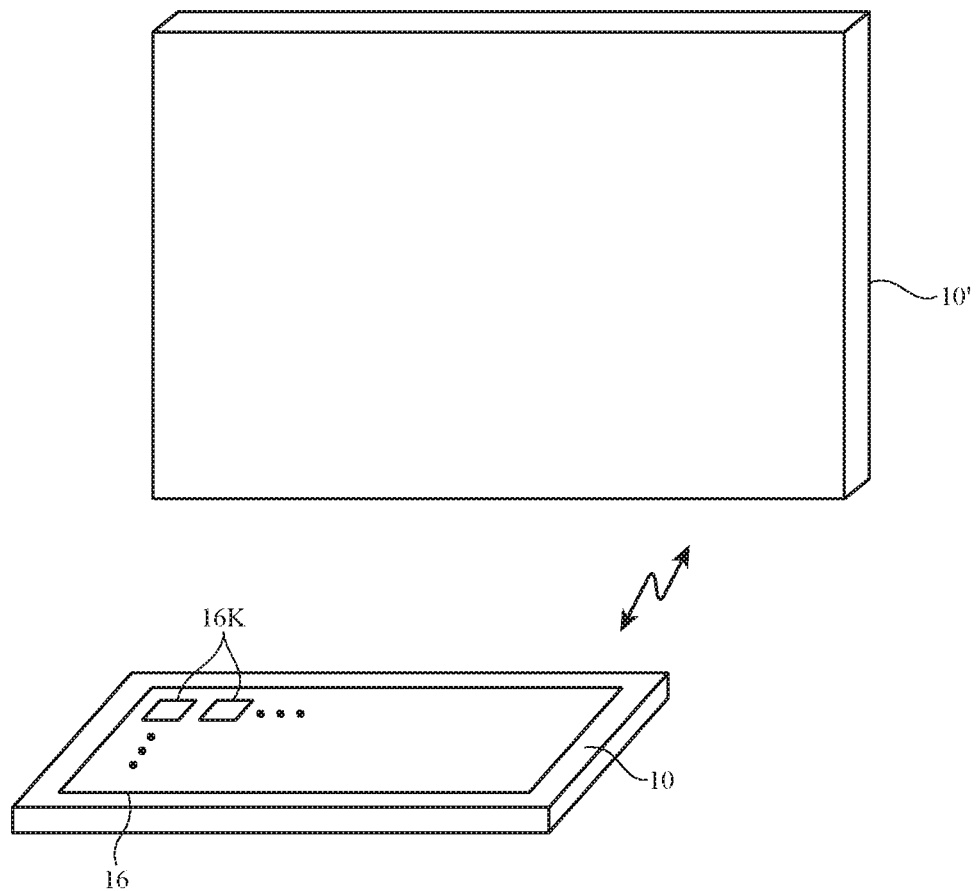
FIG. 2 is a perspective view of an illustrative keyboard of the type that may be used to interact with a computer in accordance with an embodiment.

If desired, electronic device 10 may be a keyboard accessory device. This type of arrangement is shown in FIG. 2. As shown in FIG. 2, device 10 of FIG. 2 has a keyboard 16 with reconfigurable keys 16K. Device 10, which may be referred to as a keyboard, stand-alone keyboard, or accessory keyboard, keyboard device, etc., may communicate with external electronic equipment such as computer 10' (e.g., a tablet computer, desktop computer, television, set-top box, and/or other electronic device). Wired and/or wireless communications may be used between device 10 and 10'.

Device 10 may, in general, be any suitable type of device. For example, device 10 may be a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. The laptop computer of FIG. 1 and the keyboard of FIG. 2 are merely illustrative.

Figure 3:
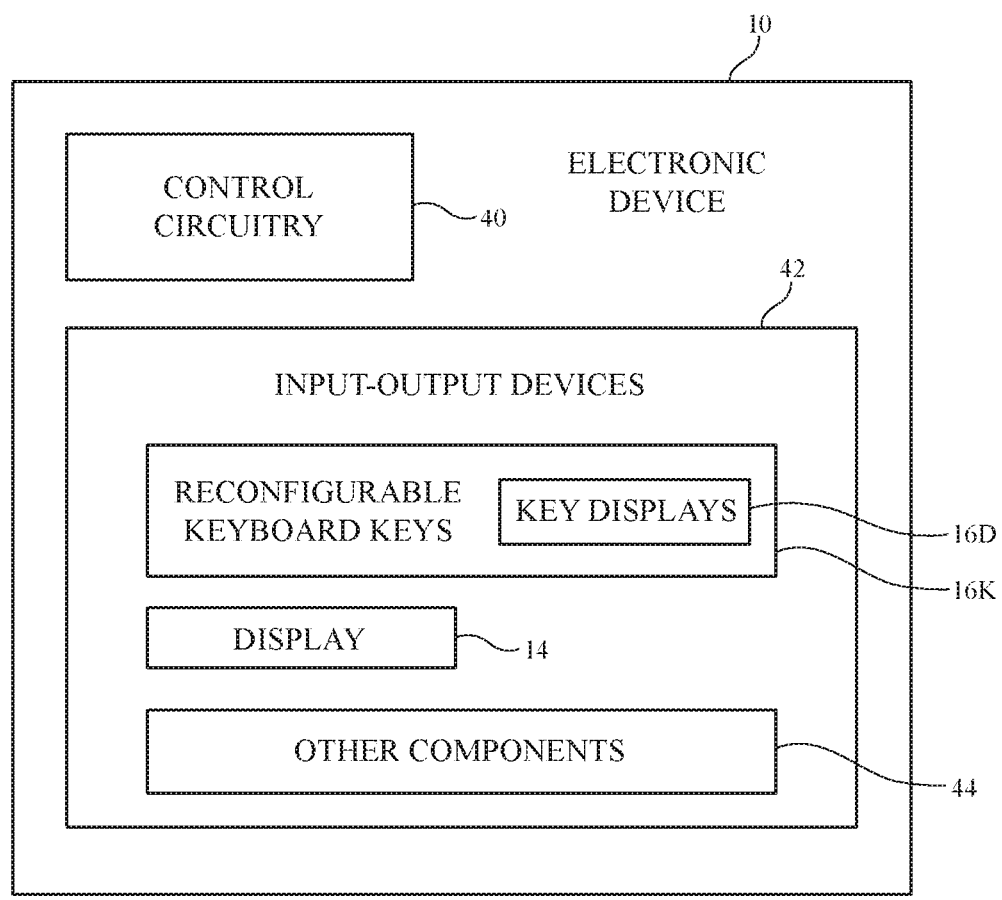
FIG. 3 is a schematic diagram of an illustrative electronic device in accordance with an embodiment.

A schematic diagram showing illustrative components that may be used in device 10 is shown in FIG. 3. As shown in FIG. 3, device 10 may include control circuitry 40. Control circuitry 40 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 40 may be used to control the operation of device 10. This processing circuitry may be based on one or more microprocessors, microcontrollers, digital signal processors, application specific integrated circuits, etc.

Circuitry 40 may be used to run software on device 10, such as software that gathers user input (e.g., key press input and/or other input) and takes corresponding action in controlling the components of device 10 (e.g., displaying information on display 14, etc.). To support interactions with external equipment, circuitry 40 and the software running on circuitry 40 may be used in implementing communications protocols. The software (code) for implementing these functions may be stored in a non-transistory storage medium (e.g., non-volatile memory, etc.).

Electronic device 10 may include input-output devices 42. Input-output devices 42 may be used by a user to supply data to device 10 and/or may be used to gather data from the environment surrounding device 10. Input-output devices 42 may also be used to provide data from device 10 to external devices and/or to supply output to a user. Input-output devices 42 may include keyboard keys 16K, displays such as main display 14 and ancillary touch screen display 20, and other components 44. Keys 16K may each include a key display 16D that can be used to display a selectable key label (e.g., an icon, alphanumeric character, or other symbol). Components 44 may, if desired, include user interface devices, data port devices, and other input-output components. For example, components 44 may include touch screens, displays without touch sensor capabilities, buttons, scrolling wheels, touch pads, key pads, keyboards, microphones, cameras, buttons, speakers, status indicators, light sources, audio jacks and other audio port components, digital data port devices, light sensors, light-emitting diodes, motion sensors (accelerometers), capacitance sensors, proximity sensors, magnetic sensors, force sensors (e.g., force sensors coupled to a display to detect pressure applied to the display), wireless circuitry, etc.

Keyboard keys 16K may each have a movable key member (sometimes referred to as a key cap or key body) that can be pressed by a finger of a user when the user desires to supply keyboard 16 with key press input. The key member may be formed from materials such as glass, ceramic, polymer, crystalline material such as sapphire, metal structures, and/or other materials. With one illustrative configuration, which is described herein as an example, some or all of the upper surface of each key 16K (e.g., a key member portion in each key 16K) may include a coherent fiber bundle that overlaps a key display in that key and that allows a viewer to clearly view a key label that is being displayed on that key display.

Figure 4:
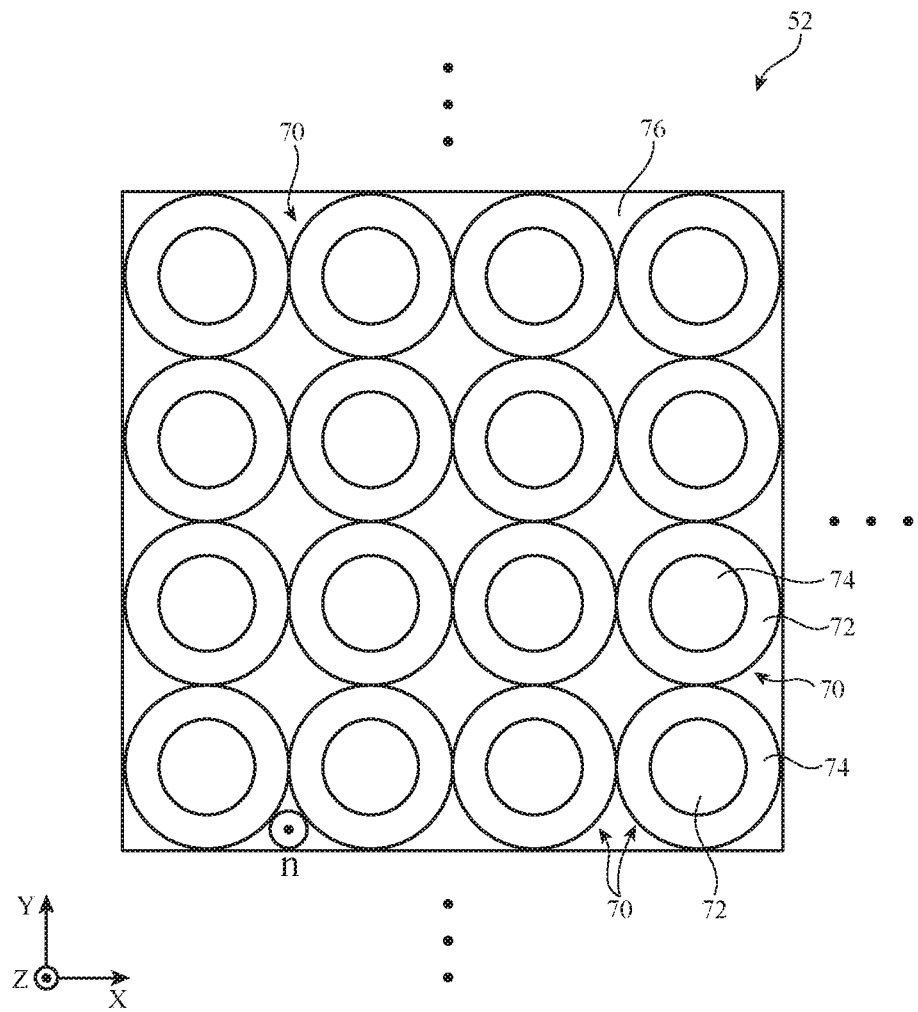
FIG. 4 is a top view of an illustrative coherent fiber bundle in accordance with an embodiment.

A top view of an illustrative coherent fiber bundle that is being used to form part of a key member is shown in FIG. 4. As shown in FIG. 4, key member 52 may include a coherent fiber bundle having an array of fibers 70. Fibers 70, which may sometimes be referred to as optical fibers, optical waveguides, or fiber waveguides, may each have a core such as core 72 of a first refractive index and a surrounding cladding layer such as cladding 74 of a second refractive index. The value of the second refractive index may be lower than the value of the first refractive index to support light guiding within fibers 70 in accordance with the principal of total internal reflection. Fibers 70 may be formed from glass, polymer, and/or other transparent material. Cores 72 may have outer diameters that are 60-70%, at least 50%, less than 80%, or other suitable fraction of the outer diameters of claddings 74. If desired, binder material such as binder 76 may be used to hold fibers 70 together in a bundle. Binder 76 may, if desired, be a polymer and may have a refractive index matched to the second refractive index or different than the second refractive index. In some configurations, claddings 74 may be omitted and binder 76 may be used to form the cladding for cores 72. The configuration of FIG. 4 is merely illustrative.

Surface normal n of key member 52 of FIG. 4 extends parallel to the Z axis (out of the page in the orientation of FIG. 4). In keys 16K, key member 52 may overlap key displays and the surface normal of each key display may be parallel to surface normal n.

The coherent fiber bundle of FIG. 4 may be sliced into thin layers (e.g., layers that are parallel to the X-Y plane of FIG. 4 and that are 0.1 to 5 mm thick along the Z axis, at least 0.3 mm thick, at least 0.7 mm thick, less than 4 mm thick, etc.), thereby forming a fiber-optic plate for key member 52. The fiber-optic plate is a planar member that lies in the X-Y plane of FIG. 4. Fibers 70 run perpendicular to the surface normal of the fiber-optic plate (e.g., into and out of the page along the Z axis in FIG. 4). The fiber-optic plate may have planar surfaces, curved surfaces (e.g., one or more surfaces of compound curvature or other curved surfaces), and/or surfaces of other shapes. When viewed from above (e.g., the view of FIG. 4), the fiber-optic plate may have a rectangular outline, an oval shape, a circular shape, a rectangular shape with rounded corners, or other suitable key member shape.

Figure 5:
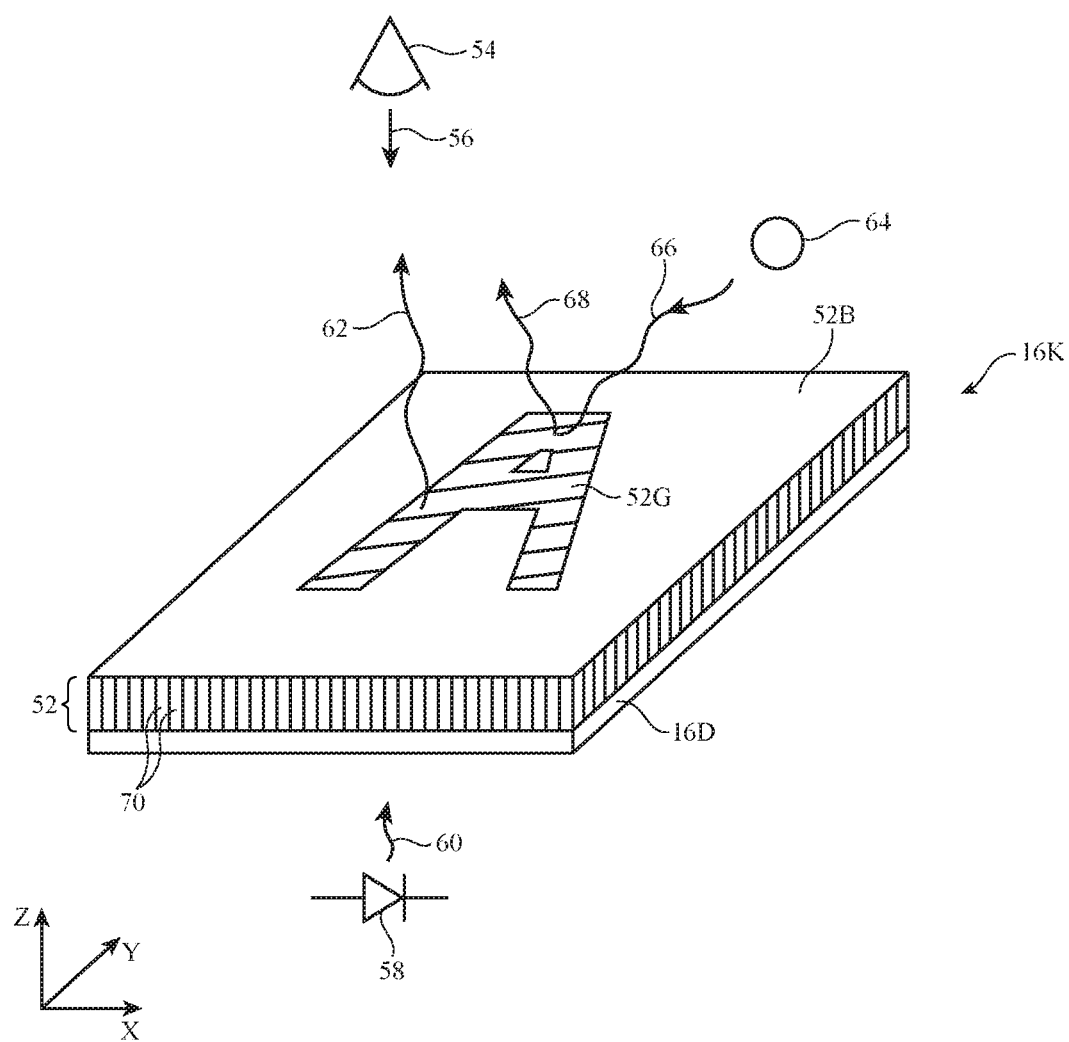
FIG. 5 is a perspective view of an illustrative key having a key member formed from a coherent fiber bundle in accordance with an embodiment.

A perspective view of an illustrative keyboard key in keyboard 16 is shown in FIG. 5. As shown in FIG. 5, keyboard key 16K may have a key member (sometimes referred to as a key cap) such as key member 52 that is formed from a coherent fiber bundle (e.g., a fiber-optic plate in which fibers 70 extend vertically parallel to the Z axis). Coherent fiber bundle key member 52 may have opposing upper and lower surfaces. The upper (outwardly facing) surface of key member 52 may be pressed downward (in the −Z direction) by a user's finger when the user desires to provide device 10 with key press input.

Key display 16D may be formed on the lower (inwardly facing) surface of key member 52. This surface may be planar. During operation, control circuitry 40 (FIG. 1) may use key display 16D to display a desired key label. Due to the presence of the coherent fiber bundle (fiber-optic plate) of member 52, the key label image that is displayed on key display 16D is presented for the viewer on the opposing upper surface of key member 52. In effect, the viewer will view the displayed key label as if the key display 16D were formed on the upper surface of key member 52, even though key display 16D is, in fact, located at the lower surface of key member 52 and is protected from damage by the thickness of key member 52. This enhances the appearance of the key label and key 16K while allowing the key display to be located in a protected position within key 16K. If key member 52 were formed form a clear layer of material without embedded optical waveguides such as fibers 70, images formed on key display 16D would not appear to be displayed on the upper surface of key member 52, but rather would appear on the bottom surface of key member 52 and would be distorted when viewed at off-axis angles due to refraction from the clear layer of material.

In the example of FIG. 5, key label 52G is being presented on the upper face of key member 52. Key label 52G (e.g., an alphanumeric character or other keyboard key symbol) may serve as a label for key 16K and may be an alphanumeric character, icon, or other symbol. Key label 52G may be white and key label background 52B may be black or vice versa. Configurations in which key labels presented on key display 16D have non-neutral color content (e.g., red, green, blue, etc.) may also be used. In some configurations, key labels 16D may be animated. Trim patterns (e.g., peripheral ring-shaped trim, etc.) may be incorporated into the key labels, if desired.

Keyboard key 16K may, if desired, be backlit. For example, a light source such as light-emitting diode 58 (e.g., a white light-emitting diode or other backlight illumination source) may emit light 60 that is blocked by opaque portions of key display 16D and that is permitted to pass by transparent portions of key display 16D (e.g., neutrally colored and/or non-neutrally colored transparent portions). Light transmitted through key label 52G (e.g., transmitted light 62) may be viewed by a user such as user 54 who is viewing keyboard key 16K in direction 56. In some arrangements, backlight light sources such as light-emitting diode 58 may be omitted. In non-backlit key arrangements, and/or configurations in which ambient lighting conditions are bright, viewer 54 will view ambient light that has passed through key member 52 to key display 16D and has then reflected back in the outward direction through key member 52. In this type of situation, viewer 54 will view reflected ambient light (e.g., ambient light 66 from ambient light source 64 that has reflected off of key label 52G as reflected ambient light 68).

Figure 6:
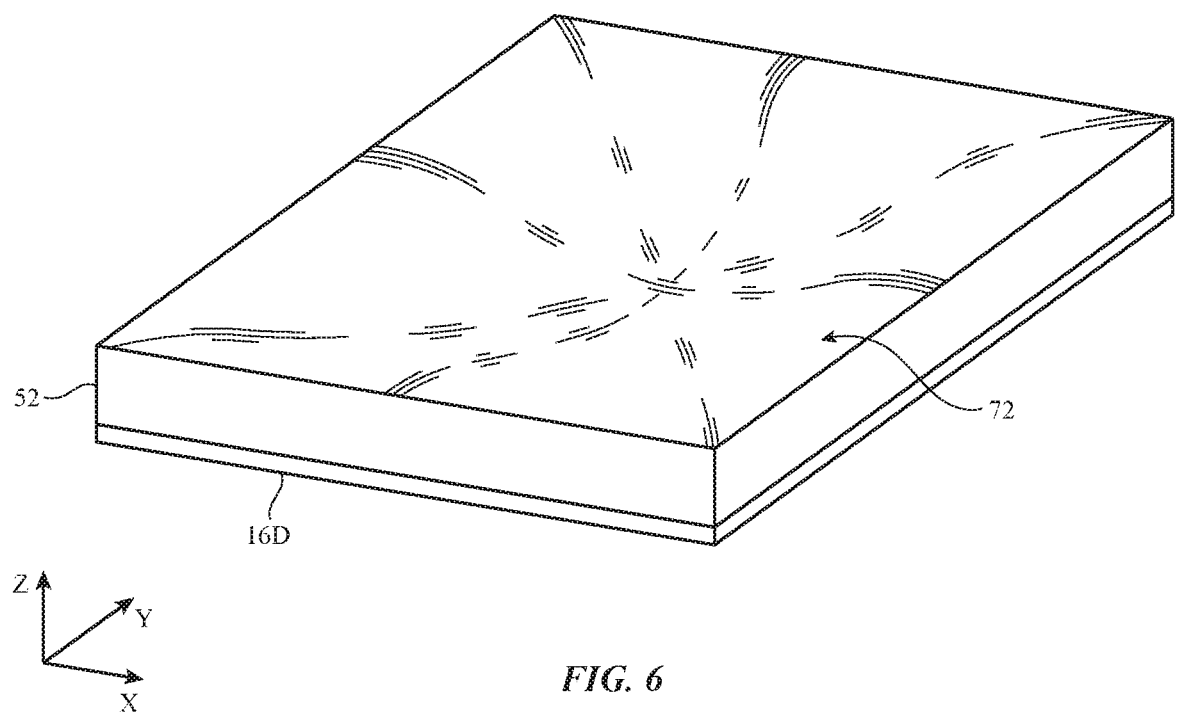
FIG. 6 is a perspective view of an illustrative key having a coherent fiber bundle with a surface of compound curvature in accordance with an embodiment.

If desired, key member 52 may have one or more curved surfaces. In the example of FIG. 6, key member 52 has a planar lower surface that overlaps key display 16D and has an opposing upper surface 72 with compound curvature (e.g., curvature about both the X and Y axes of FIG. 6). The compound curvature of the upper (key press) surface of key member 52 may help accommodate a rounded human fingertip as a user supplies key press input to key member 52. At the same time, the planar lower surface of key member 52 may facilitate attachment of key display 16D without creating wrinkles or other damage in key display 16D.

Figure 7:
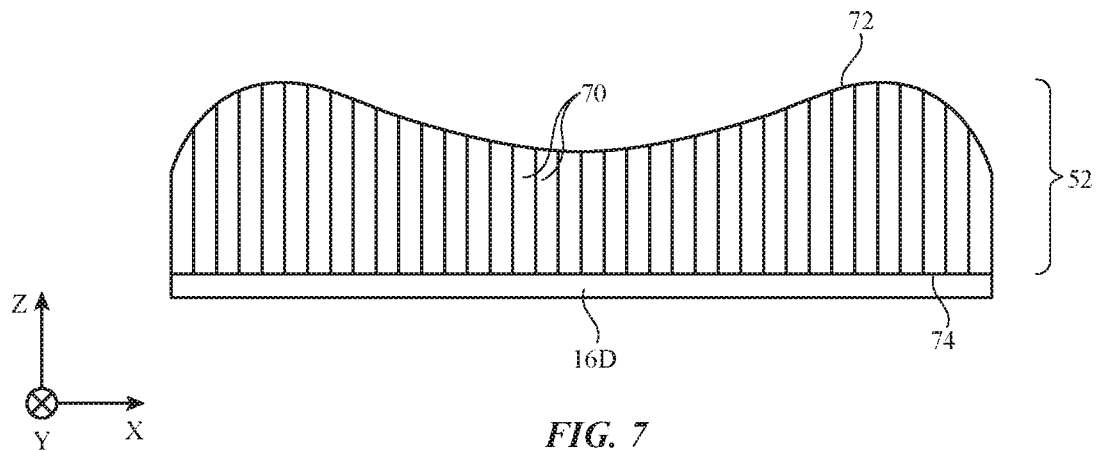
FIG. 7 is a cross-sectional side view of an illustrative coherent fiber bundle in a key with a curved surface in accordance with an embodiment.
Figure 8:
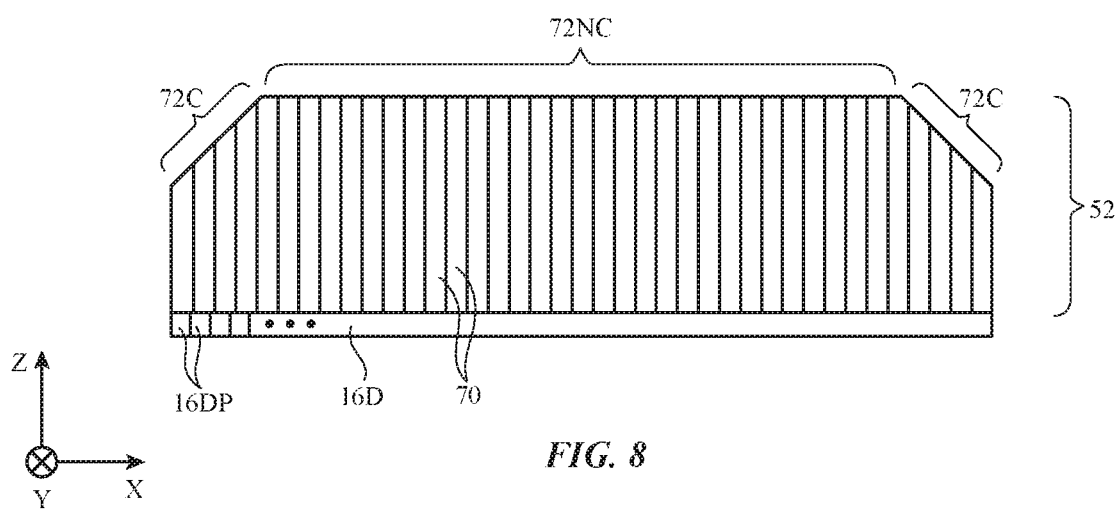
FIG. 8 is a cross-sectional side view of an illustrative coherent fiber bundle in a key with chamfered edges in accordance with an embodiment.

FIG. 7 is a cross-sectional side view of key member 54 showing how upper surface 72 of key member 52 may have a curved cross-sectional profile while opposing lower surface 74 of key member 54 may have a planar surface against which key display 16D is mounted. In the example of FIG. 8, key member 52 has a flat central surface 72NC (which may optionally have compound curvature) and has chamfered edge surfaces 72C (e.g., a peripheral chamfered edge that runs around the periphery of key member 52). Key display 16D may include an array of pixels 16DP for displaying key labels (e.g., a two-dimensional pixel array that extends across the lower surface of member 52).

Figure 9:
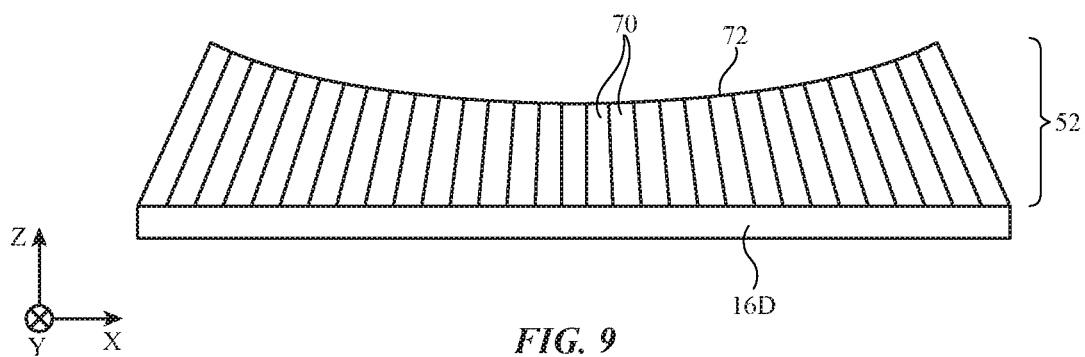
FIG. 9 is a cross-sectional side view of an illustrative coherent fiber bundle in a key that is configured to demagnify a dynamic key label in accordance with an embodiment.

FIG. 9 is a cross-sectional side view of an illustrative configuration for key member 52 in which fibers 70 are tapered inwardly as height (in vertical direction Z) increases above key display 16D. This arrangement tends to increase the resolution of key label images displayed on upper surface 72, because the pixel density of 16D is effectively increased as pixel light is redirected to the smaller effective area on surface 72 by the narrowing of inwardly tapered fibers 70. Because the image displayed on the tapered upper surface of key member 52 is smaller than the image created at the output of display 16D, the effect of the coherent fiber bundle of key member 52 of FIG. 9 is to demagnify the key label displayed on the key display.

Figure 10:
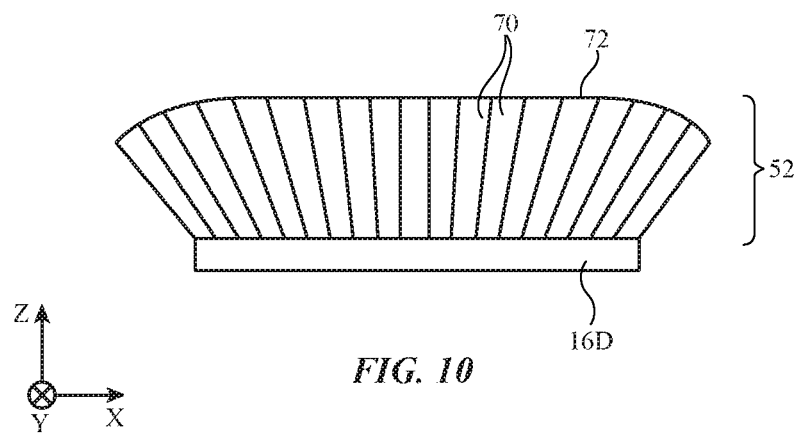
FIG. 10 is a cross-sectional side view of an illustrative coherent fiber bundle in a key that is configured to magnify a dynamic key label in accordance with an embodiment.

FIG. 10 is a cross-sectional side view of an illustrative configuration for key member 52 in which fibers 70 are tapered outwardly to magnify the key label displayed on the key display. If desired, the peripheral edges of key member 52 may be flared (e.g., to enhance the appearance of key 16K, to enhance visibility of a trim pattern along the edge of key member 52, etc.).

Figure 11:
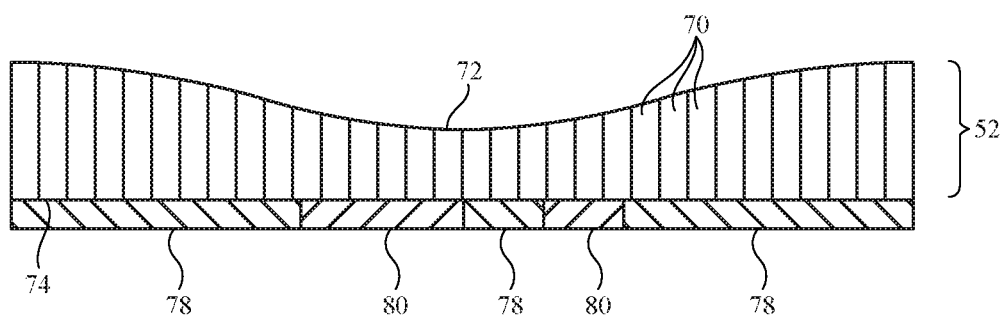
FIG. 11 is a cross-sectional side view of an illustrative coherent fiber bundle in a key with a static key label formed from patterned dark and light materials in accordance with an embodiment.

If desired, key display 16D may be omitted and ink patterns or patterns of other material may be used in forming key labels for keys 16K. In the example of FIG. 11, dark material such as black ink 78 (e.g., polymer with dark dye and/or pigment) and light material such as white ink 80 (e.g., polymer with bright dye and/or pigment) have been patterned onto lower surface 74 of key member 50. Due to the presence of optical fibers 70 in key member 52, the key label that is formed on lower surface 74 will appear to a user as being present on upper surface 72, thereby enhancing the appearance of key 16K.

Figure 12:
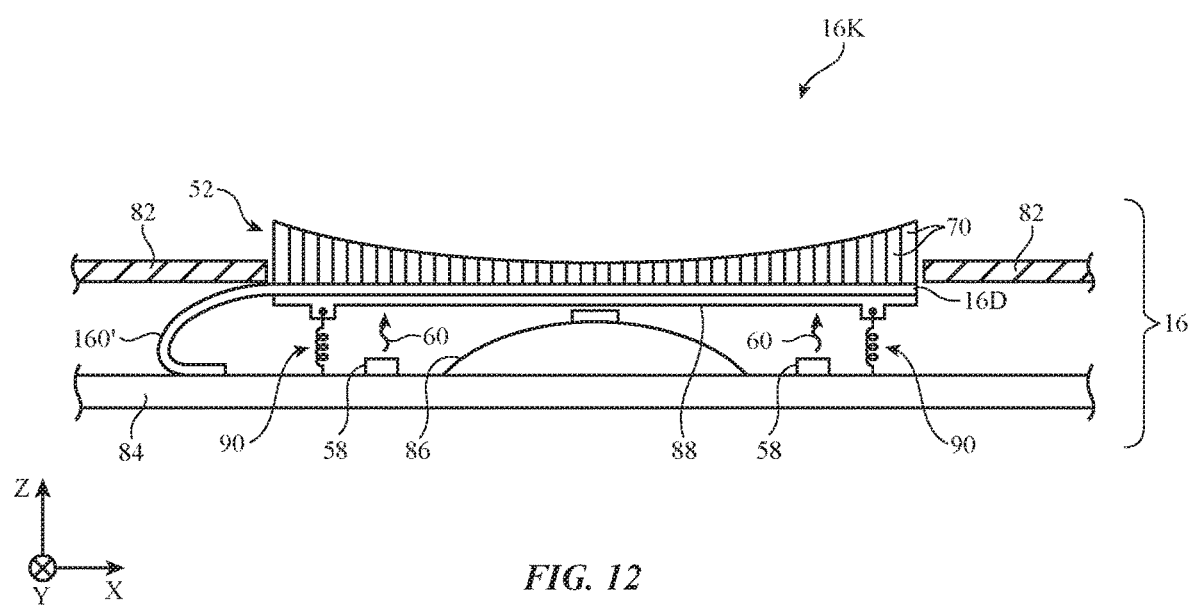
FIG. 12 is a cross-sectional side view of an illustrative key with a dynamic key label and a coherent fiber bundle in accordance with an embodiment.

An illustrative keyboard with a reconfigurable key 16K is shown in FIG. 12. Key member 52 of FIG. 12 is formed from a fiber-optic plate (e.g., a coherent fiber bundle formed from fibers 70). Key member 52 may be moved downward (in the −Z direction) when pressed inwardly (downwardly) by a user's finger. When pressed downward (inwardly into keyboard 16), key member 52 may compress dome switch 86 and may compress spring members or other key member biasing structures such as illustrative key member biasing structures 90. Switch 86 or other movement sensing component in keyboard 16 may be used to monitor movement of key member 52. Control circuitry 40 (FIG. 1) is coupled to dome switch 86 using signal paths in printed circuit 84 and can detect when dome switch 86 has been compressed, thereby gathering key press input from key 16K. When key member 52 is released, dome switch 86 and biasing structures 90 presses key member 52 outwardly (upwards in the +Z direction).

Key member 52 may be mounted in an opening in keyboard housing member 82. Housing member 82 may be an upper layer of housing 12B of FIG. 1 or other suitable housing wall structure. A two-dimensional array of openings may receive key members 52 for keys 16K (see, e.g., the openings of housing 12B of FIG. 1) or other suitable opening patterns may be used.

Key display 16D may be coupled to the lower surface of key member 52 (e.g., using clear adhesive, etc.). If desired, a supporting member such as support structure 88 (e.g., a metal or plastic plate, etc.) may be formed between key display 16D and dome switch 86. Biasing structures 90 may be coupled between printed circuit board 84 and support structure 88. Key display 16D may have a tail portion such as portion 16D' that has signal paths that couple display 16D to signal paths in printed circuit 84, thereby coupling each key display 16D in keyboard 16 to control circuitry 40. If desired, key displays 16D may be formed from tongues protruding from a common flexible substrate.

Key display 16D may be a display that emits light (e.g., an organic light-emitting diode display or other light-emitting diode display) or may be a liquid crystal display or electrophoretic display, or other display with adjustable light reflection and/or light transmission properties. Transparent displays without light-emitting diode pixels such as transparent electrophoretic displays can be backlit using one or more optional backlighting light-emitting diodes 58. Each light-emitting diode 58 may emit backlight illumination 60 that can pass through clear portions of display 16D. Support structure 88 may, if desired, be transparent (with or without haze to help diffuse light) to allow backlight illumination to illuminate key label images on display 16D.

Figure 13:
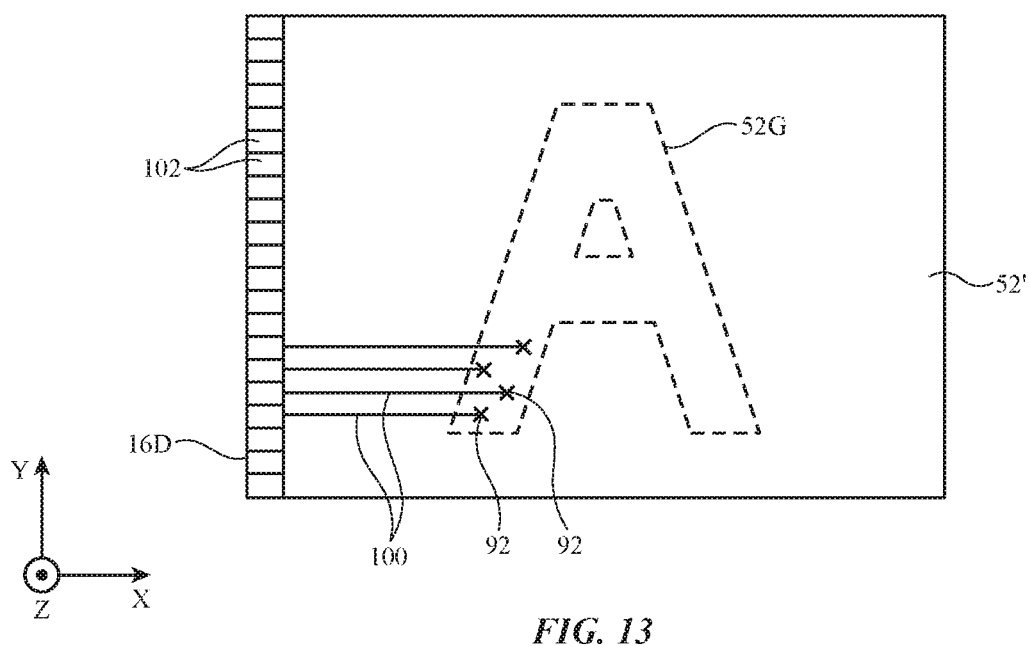
FIG. 13 is a top view of an illustrative key label illuminated using optical fibers and an edge-mounted key display in accordance with an embodiment.
Figure 14:
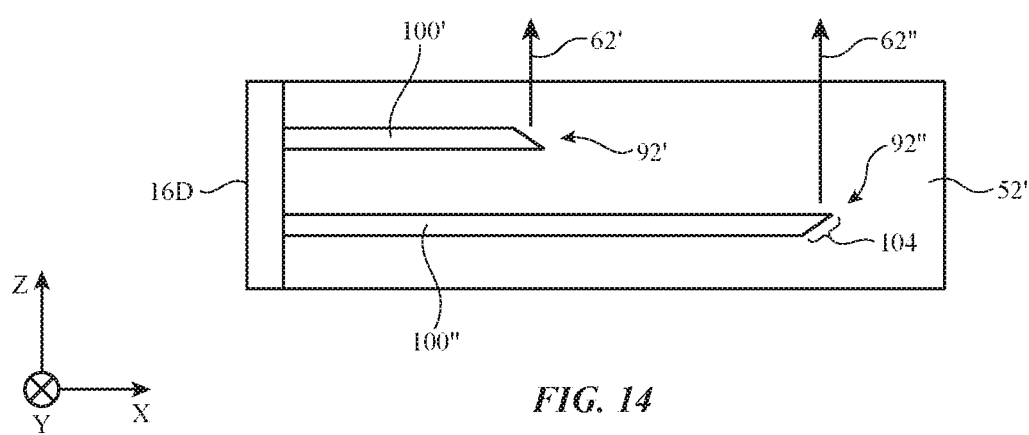
FIG. 14 is a side view of an illustrative key label illuminated using optical fibers and an edge-mounted key display in accordance with an embodiment.

In the example of FIGS. 13 and 14, key member 52' includes a set of horizontally extending optical fibers 100 (e.g., fibers with cores and cladding and optionally bound together using polymer binder) or other horizontal optical waveguides. As shown in FIG. 13, key display 16D may include pixels 102 that can be dynamically adjusted when displaying key label images such as key label 52G on key member 52'. If desired, there may be only a single light-emitting diode in key 16K or a relatively small number of light-emitting diodes (e.g., 2-10, at least 3, etc.) instead of using a pixelated display such as display 16D. The use of display 16D in the example of FIG. 13 is illustrative.

Fibers 100 have light-reflecting structures at ends 92 (or other portions along the lengths of fibers 100) that direct light upwards in direction +Z towards a viewer. Ends 92 may be arranged in any suitable pattern over the surface of key member 52' (e.g., in a plurality of predetermined patterns corresponding to one or more different key labels, uniformly in a grid, etc.). Key symbol 52G may be fixed or the light-emitting diodes of key 16K (e.g., light-emitting diodes in pixels 102 of key display 16D) may be selectively activated to control the pattern of light emitted from ends 92. The cross-sectional side view of key member 52' in FIG. 14 shows how the ends of the horizontally extending fibers in key member 52' may have reflective structures. For example, fiber 100' may have a beveled end 92' that reflects light 62' upwards in direction +Z and fiber 100" may have a beveled end 92' that is covered with reflective layer 104 (e.g., a layer of metal) to reflect light 62" upward.

If desired, stand-alone buttons (keys) may use coherent fiber bundles of the type shown in key members 52. The use of keys 16K to form keyboard 16 is merely illustrative.

The foregoing is merely illustrative and various modifications can be made to the described embodiments. The foregoing embodiments may be implemented individually or in any combination.

What is claimed is:

1. An electronic device, comprising:
a housing;
a printed circuit; and
an input device coupled to the housing, wherein the input device comprises:
a support structure;
a display that is formed on the support structure;
a coherent fiber bundle, wherein the display is interposed between the support structure and the coherent fiber bundle; and
a mechanical switch that is mounted to the printed circuit and that is configured to detect input on the coherent fiber bundle, wherein the coherent fiber bundle, display, and support structure are configured to move towards the mechanical switch in response to input on the coherent fiber bundle.

2. The electronic device defined in claim 1, wherein the coherent fiber bundle has a plurality of optical fibers that have portions extending parallel to a surface normal of the display.

3. The electronic device defined in claim 2, wherein the coherent fiber bundle has opposing first and second surfaces, wherein the first surface is adjacent to the display, and wherein the display is configured to display content that appears on the second surface.

4. The electronic device defined in claim 3, wherein the second surface of the coherent fiber bundle has curvature about both a first axis and a second axis that is perpendicular to the first axis.

5. The electronic device defined in claim 3, wherein the coherent fiber bundle is tapered and demagnifies the content on the display.

6. The electronic device defined in claim 3, wherein the coherent fiber bundle is tapered and magnifies the content on the display.

7. The electronic device defined in claim 1, wherein the coherent fiber bundle has chamfered edges.

8. The electronic device defined in claim 1, wherein the input device further includes biasing structures that are coupled between the support structure and the printed circuit.

9. The electronic device defined in claim 1, wherein the mechanical switch is a dome switch.

10. The electronic device defined in claim 1, wherein the display is interposed between the coherent fiber bundle and the mechanical switch.

11. An input device, comprising:
a coherent fiber bundle having opposing first and second surfaces, wherein the coherent fiber bundle comprises optical fibers that extend between the first surface and the second surface;
a display coupled to the first surface that is configured to display a reconfigurable image viewable at the second surface, wherein the second surface of the coherent fiber bundle has curvature about both a first axis and a second axis that is perpendicular to the first axis; and
a mechanical switch that is configured to detect movement of the coherent fiber bundle in response to a press input on the coherent fiber bundle.

12. The input device defined in claim 11, wherein the display comprises an electrophoretic display.

13. The input device defined in claim 11, wherein the display comprises an organic light-emitting diode display.

14. The input device defined in claim 11, wherein the first surface is planar and wherein the display is interposed between the mechanical switch and the coherent fiber bundle.

15. The input device defined in claim 11, further comprising:
a support structure that is interposed between the mechanical switch and the display; and
biasing structures that are coupled to the support structure.

16. An electronic device comprising:
a housing; and
an input device that is coupled to the housing and that includes:
a touch-sensitive component;
a display; and
a coherent fiber bundle that overlaps the display, that has first and second opposing surfaces, and that comprises optical fibers that extend between the first surface and the second surface, wherein the display is configured to display a reconfigurable image viewable at the second surface, wherein the second surface of the coherent fiber bundle has curvature about both a first axis and a second axis that is perpendicular to the first axis, and wherein the touch-sensitive component is configured to detect a press input on the second surface.

17. The electronic device defined in claim 16, wherein the touch-sensitive component comprises a mechanical switch and wherein the coherent fiber bundle and display are configured to move towards the mechanical switch in response to the press input.

18. The electronic device defined in claim 16, wherein the touch-sensitive component comprises a touch sensor selected from the group consisting of: a resistive touch sensor and a capacitive touch sensor.

19. The electronic device defined in claim 16, wherein the touch-sensitive component comprises a light-based sensor.

20. The electronic device defined in claim 16, wherein the input device further comprises:
   a support structure that is interposed between the touch-sensitive component and the display; and
   biasing structures that are coupled to the support structure.

* * * * *